US006923272B2

(12) United States Patent
Jansson et al.

(10) Patent No.: US 6,923,272 B2
(45) Date of Patent: Aug. 2, 2005

(54) PNEUMATIC POWER TOOL WITH EXHAUST AIR OUTLET DEFLECTOR

(75) Inventors: Anders Urban Jansson, Älvsjö (SE); Mikael John Nordström, Johanneshov (SE); Ulf Michael Stenberg, Djurhamn (SE)

(73) Assignee: Atlas Copco Tools AB, Nacka (SE)

( * ) Notice: Subject to any disclaimer, the term of this patent is extended or adjusted under 35 U.S.C. 154(b) by 0 days.

(21) Appl. No.: 10/496,933

(22) PCT Filed: Nov. 25, 2002

(86) PCT No.: PCT/SE02/02149

§ 371 (c)(1), (2), (4) Date: Oct. 8, 2004

(87) PCT Pub. No.: WO03/045637

PCT Pub. Date: Jun. 5, 2003

(65) Prior Publication Data

US 2005/0039934 A1 Feb. 24, 2005

(30) Foreign Application Priority Data

Nov. 26, 2001 (SE) .............................................. 0103927

(51) Int. Cl.[7] .......................... B25B 19/00; B23B 43/04

(52) U.S. Cl. ....................... 173/169; 173/168; 173/170; 173/DIG. 2

(58) Field of Search ................................ 173/168, 169, 173/170, 162.1, 162.2, DIG. 2; 227/130

(56) References Cited

U.S. PATENT DOCUMENTS 4,778,015 A * 10/1988 Jacobsson .................. 173/169
5,110,030 A * 5/1992 Tanji .......................... 227/130
5,377,769 A 1/1995 Hasuo et al.
5,417,294 A 5/1995 Suher
5,775,439 A * 7/1998 Biek ............................ 173/1
5,918,686 A 7/1999 Izumisawa
6,135,213 A * 10/2000 Schoeps .................... 173/93.5
6,158,528 A * 12/2000 Izumisawa .................. 173/168
6,199,383 B1 * 3/2001 Pusateri ....................... 60/695
6,443,239 B1 * 9/2002 Izumisawa .................. 173/169
6,796,386 B2 * 9/2004 Izumisawa et al. ........ 173/93.5

FOREIGN PATENT DOCUMENTS

EP 0849052 A2 6/1998
WO WO 0154865 A2 8/2001

* cited by examiner

*Primary Examiner*—Scott A. Smith
(74) *Attorney, Agent, or Firm*—Frishauf, Holtz, Goodman & Chick, P.C.

(57) ABSTRACT

A pneumatic power tool comprises a housing (10, 11) with a motor and a pressure air inlet passage (12) and an exhaust air outlet passage (16) both extending through the housing (10, 11) and communicating with the motor, wherein the outlet passage (16) is provided with sound attenuating elements (36, 37) formed in a highly porous resinous material and arranged to be penetrated by the exhaust flow for exhaust noise reduction, and an exhaust flow diverting deflector (17) mounted at the outlet end of the outlet passage (16) and comprising a shell like body (18) with a cylindrical neck portion (19) rotatively received in the outlet passage (16), a concave flow guiding surface (28), and two parallel inner walls (30*a, b*) forming between them a main flow passage (31) and between them and the shell body (18) two narrow secondary flow passages (32*a, b*) for accomplishing noise dampening low velocity air flow shields on both sides of the main flow.

16 Claims, 1 Drawing Sheet

PNEUMATIC POWER TOOL WITH EXHAUST AIR OUTLET DEFLECTOR

This application is a U.S. National Phase Application under 35 USC 371 of International Application PCT/SE02/02149 filed Nov. 25, 2002.

This invention relates to a pneumatic power tool having a housing with a motor and a pressure air inlet passage and an exhaust air outlet passage, wherein an exhaust air outlet deflector is movably mounted on the housing for directing the exhaust air leaving the tool in any desired direction.

In prior art there are known pneumatic power tools of the above type, wherein the outlet deflectors comprise more or less flow restricting passages creating undesirable pressure drops and motor power reductions. Examples thereon are illustrated in for instance U.S. Pat. Nos. 6,110,145 and 5,954,142.

It is a main object of the invention to provide a pneumatic power tool having an exhaust air outlet deflector which combines a low flow resistance with a sound attenuating effect.

Other objects and advantages of the invention will appear from the following specification and claims.

A preferred embodiment of the invention is below described in detail with reference to the accompanying drawing.

In the drawing.

Figure 1:
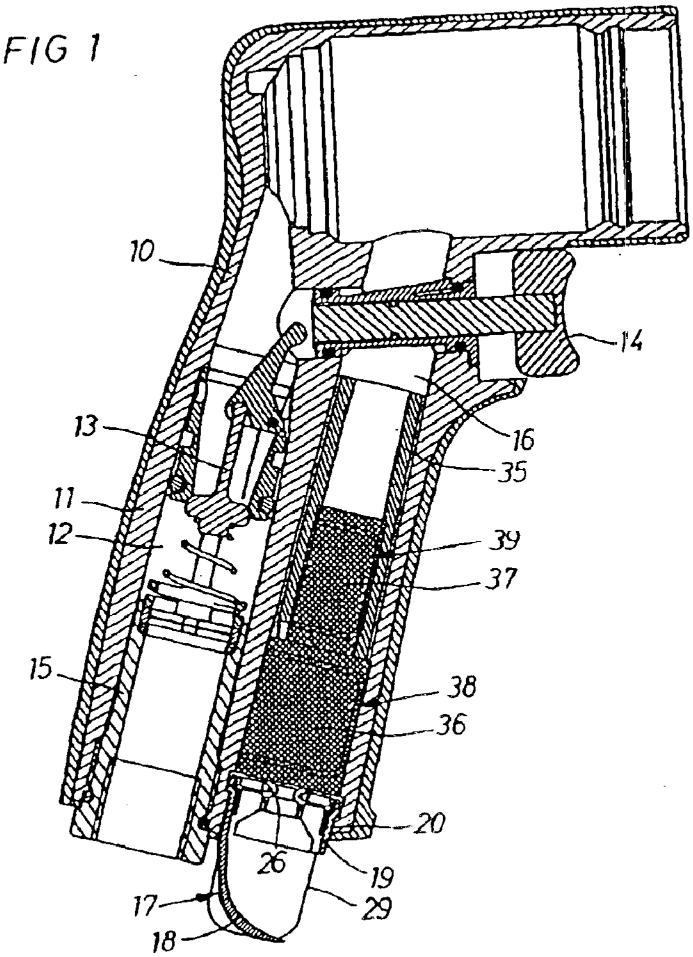
FIG. 1 shows a longitudinal section through the rear end of a power tool housing illustrating the exhaust outlet passage including an exhaust air outlet deflector according to the invention.

In FIG. 1 there is shown a section 10 of a power tool housing which is intended to support a non-illustrated pneumatic motor and which comprises a pistol type handle 11 having a pressure air inlet passage 12 and a throttle valve 13 to be operated by a press button 14. The inlet passage 12 is arranged to communicate with an inlet port on the motor (not shown) and is provided with a connection sleeve 15 for connection of a pressure air supply conduit (not shown). The handle 11 further comprises an exhaust air outlet passage 16 communicating with the exhaust ports of the motor (not shown) and arranged to lead exhaust air from the motor to the atmosphere via an outlet deflector 17.

Figure 5:
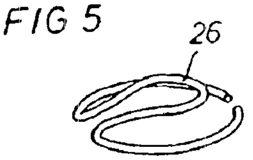
FIG. 5 shows a spring element for applying an expansion force on the outlet deflector and forming an axial support for the sound attenuating inserts.
Figure 2:
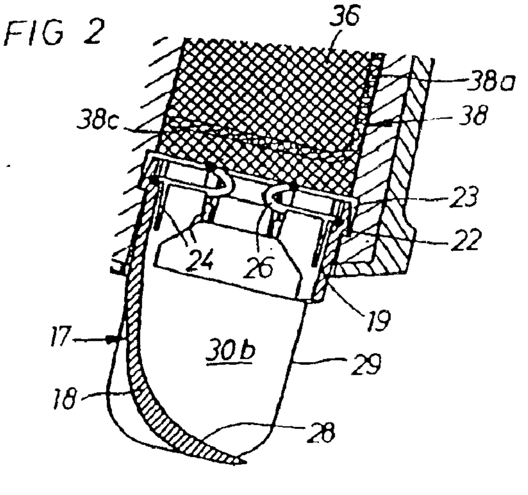
FIG. 2 shows, on a larger scale, a fractional view of the downstream end of the outlet passage.

The outlet deflector 17 comprises a shell-like body 18 with a cylindrical neck portion 19 which is rotatively mounted in a socket portion 20 of the outlet passage 16. A circumferential outer shoulder 22 on the neck portion 19 engages by snapping a circular groove 23 in the outlet passage 16. In order to facilitate mounting of the neck portion 19 there are provided a number of axial weakening slots 24 in the neck portion 19, and in order to enhance the snapping action of the shoulder 22 into the groove 23 of the outlet passage 16 an Ω-shaped spring element 26 (see FIG. 5) is inserted in an inner circumferential groove 27 in the deflector neck portion 19. The neck portion 19 defines an inlet opening 25 of the deflector 17.

Figure 4:
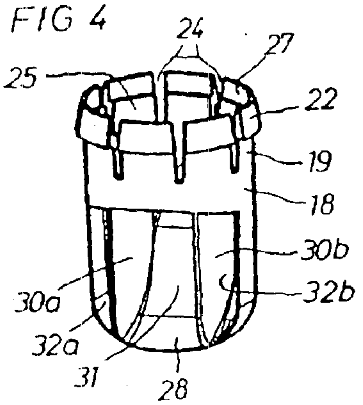
FIG. 4 shows a perspective view of the exhaust outlet deflector.

Moreover, the outlet deflector 17 is formed with a concave guide surface 28 for diverting the outlet flow out through a side opening 29. The deflector 17 is also provided with two parallel longitudinal inner walls 30*a,b* which form between them a central main passage 31, and which together with the side walls of the deflector shell 18 form two narrower secondary passages 32*a,b*. See FIG. 4. Due to a certain small retardation via friction of the flow through the narrow secondary passages 32*a,b* there are formed noise damping low velocity air shields on both sides of the faster air flow through the main passage 31. Apart from the relatively small friction caused by the inner walls 30*a,b*, this outlet deflector is a free flow deflector diverting the exhaust air flow in a non-turbulent way in a lateral direction as desired without causing any further flow restrictions.

In the outlet passage 16 there are inserted sound attenuating means in the form a downstream full size element 36 of a highly porous and elastic resinous material, a smaller upstream element 37 of the same porous material as the downstream element 36, and a sound absorbing lining 35 surrounding the upstream element 37 and covering a substantial part of the inner wall of the outlet passage 16 upstream of the full size element 36. The full size element 36 fills up the entire outlet passage 16 and is axially supported on the spring element 26 which is made of a thin steel wire to cause a minimum flow restriction. The elements 36,37 are arranged to be penetrated by the exhaust air flow for noise reduction under a certain pressure drop.

The material of the elements 36 and 37 is carefully chosen so as to have a sound attenuating effect while causing a low or moderate restriction of the exhaust air outlet flow only. Materials having these properties suffer from a low mechanical load supporting capacity, and the sound attenuating elements 36,37 are not by themselves able to withstand the axial load caused by the pressure drop of the exhaust air flow across the elements 36,37 but would collapse into rather dens blocks at the outlet end of the outlet passage 16.

Figure 3:
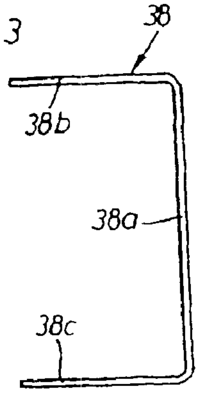
FIG. 3 shows, on a larger scale, a reinforcement element for a sound attenuating insert.

In order to prevent the two sound attenuating elements 36,37 from collapsing under the pressure drop load across them, they are provided with substantially U-shaped reinforcement elements 38,39, respectively, which extend over the main part of the length of the elements 36,37. Each reinforcement element 38,39 comprises a straight main section 38*a*, 39*a* and two legs 38*b,c* and 39*b,c* which extend perpendicularly to the main section 38*a*, 39*a*. The main section 38*a*, 39*a* is a little bit shorter than the respective sound attenuating element 36,37, and the legs 38*b,c* and 39*b,c* are penetrated transversely into the elements 36,37 at a short distance from the ends of the elements 36,37. These reinforcement elements 38,39 are made of a thin but stiff metal wire and do not cause any increase of the pressure drop across the sound attenuating elements 36,37. See FIG. 3.

The reinforcement elements 38,39 are very simple in structure and are very easily mounted on the sound attenuating elements 36,37. They are put in place just by pressing manually the legs 38*b,c* and 39*b,c,* respectively, into the porous material before inserting the elements 36,37 into the outlet passage 16.

By using reinforcement elements 38,39 as suggested by the invention it is possible to use sound attenuating elements 36,37 of a material which has good sound damping properties but suffers from a poor mechanical load carrying capacity. By designing the reinforcement elements 38,39 as simple wire elements there is obtained a very simple and cheap means to strengthen the weak porous elements 36,37 and prevent deformation of same.

In its most general form, the invention is not limited to the above described U-shape of the reinforcement elements but can be varied within the scope of the claims.

What is claimed is:

1. A pneumatic power tool, comprising:

a housing, a motor, a pressure air inlet passage and an exhaust air outlet passage both located in the housing and communicating with the motor, and an outlet deflector movably mounted on the housing for directing the exhaust air flow leaving said outlet passage in any desired direction, wherein said deflector comprises a shell body with an inlet opening located in a substantially co-axial relationship with said outlet passage, an outlet opening facing a direction substantially perpendicular to said inlet opening, and a concave guide surface arranged to divert the exhaust air flow from said inlet opening to said outlet opening, and wherein at least two parallel flow dividing vanes extend in parallel with and without affecting the flow direction through said shell body, and said flow dividing vanes form a main flow passage and at least two auxiliary flow passages which are parallel to but narrower than said main flow passage.

2. A power tool according to claim 1, wherein said flow dividing vanes extend over a main part of said shell body.

3. A power tool according to claim 2, wherein said shell body has an annular elastically expandable neck portion surrounding said inlet opening and arranged to be received in said outlet passage, and said neck portion is formed with an outer-shoulder which is brought into a locking engagement with an internal circumferential groove in said outlet passage by elastic expansion of said neck portion as said neck portion is inserted in said outlet passage.

4. A power tool according to claim 3, wherein a wire spring element is mounted inside said neck portion to enhance an elastic expansion force of said neck portion and strengthen the locking engagement between said neck portion and the housing.

5. A power tool according to claim 4, wherein said wire spring element is substantially Ω-shaped and forms an axial support of one or more noise attenuating elements located in said outlet passage.

6. A power tool according to claim 5, wherein said housing includes a pistol type handle in which said inlet and outlet passages are located, and wherein said outlet deflector is mounted at an extreme end of said handle.

7. A power tool according to claim 4, wherein said housing includes a pistol type handle in which said inlet and outlet passages are located, and wherein said outlet deflector is mounted at an extreme end of said handle.

8. A power tool according to claim 3, wherein said housing includes a pistol type handle in which said inlet and outlet passages are located, and wherein said outlet deflector is mounted at an extreme end of said handle.

9. A power tool according to claim 2, wherein said housing includes a pistol type handle in which said inlet and outlet passages are located, and wherein said outlet deflector is mounted at an extreme end of said handle.

10. A power tool according to claim 1, wherein said shell body has an annular elastically expandable neck portion surrounding said inlet opening and arranged to be received in said outlet passage, and said neck portion is formed with an outer-shoulder which is brought into a locking engagement with an internal circumferential groove in said outlet passage by elastic expansion of said neck portion as said neck portion is inserted in said outlet passage.

11. A power tool according to claim 10, wherein a wire spring element is mounted inside said neck portion to enhance an elastic expansion force of said neck portion and strengthen the locking engagement between said neck portion and the housing.

12. A power tool according to claim 11, wherein said wire spring element is substantially Ω-shaped and forms an axial support of one or more noise attenuating elements located in said outlet passage.

13. A power tool according to claim 12, wherein said housing includes a pistol type handle in which said inlet and outlet passages are located, and wherein said outlet deflector is mounted at an extreme end of said handle.

14. A power tool according to claim 11, wherein said housing includes a pistol type handle in which said inlet and outlet passages are located, and wherein said outlet deflector is mounted at an extreme end of said handle.

15. A power tool according to claim 10, wherein said housing includes a pistol type handle in which said inlet and outlet passages are located, and wherein said outlet deflector is mounted at an extreme end of said handle.

16. A power tool according to claim 1, wherein said housing includes a pistol type handle in which said inlet and outlet passages are located, and wherein said outlet deflector is mounted at an extreme end of said handle.

* * * * *